US011959302B2

(12) United States Patent
Rios et al.

(10) Patent No.: US 11,959,302 B2
(45) Date of Patent: Apr. 16, 2024

(54) DOOR HANDLE SYSTEM FOR PIVOTING A SLIDING DOOR

(71) Applicant: Overhead Door Corporation, Lewisville, TX (US)

(72) Inventors: Rogelio Rios, Odem, TX (US); John M. Gollihar, II, Corpus Christi, TX (US)

(73) Assignee: Overhead Door Corporation, Lewisville, TX (US)

( * ) Notice: Subject to any disclaimer, the term of this patent is extended or adjusted under 35 U.S.C. 154(b) by 186 days.

(21) Appl. No.: 16/940,041

(22) Filed: Jul. 27, 2020

(65) Prior Publication Data

US 2022/0025674 A1 Jan. 27, 2022

(51) Int. Cl.

*E05B 1/00* (2006.01)
*E05B 7/00* (2006.01)
*E05B 63/18* (2006.01)
*E05B 65/08* (2006.01)

(52) U.S. Cl.

CPC ............ *E05B 1/003* (2013.01); *E05B 1/0053* (2013.01); *E05B 7/00* (2013.01); *E05B 63/185* (2013.01); *E05B 65/0858* (2013.01); *Y10S 292/30* (2013.01); *Y10T 292/57* (2015.04)

(58) Field of Classification Search

CPC .......... E05B 1/003; E05B 1/0053; E05B 7/00; E05B 63/185; E05B 65/0858; E05B 65/08; E05B 65/10; Y10T 292/57; Y10T 292/0886; Y10T 292/0887; Y10T 292/096; Y10T 292/0969; Y10T 292/097; Y10T 292/0971; Y10T 292/0974; Y10T 292/1014; Y10T 292/102; Y10S 292/30

See application file for complete search history.

(56) References Cited

U.S. PATENT DOCUMENTS

| | | | | | |
|---|---|---|---|---|---|
| 140,307 | A * | 6/1873 | Rand | E05C 9/043 292/36 |
| 267,398 | A * | 11/1882 | Black | E05B 7/00 292/153 |
| 443,418 | A * | 12/1890 | Wallace | E05C 9/043 296/56 |
| 896,928 | A * | 8/1908 | Meyer | E05C 9/043 292/152 |
| 1,006,211 | A * | 10/1911 | Hermon | E05C 9/043 292/36 |
| 1,379,997 | A * | 5/1921 | MacMinn | E05B 65/087 70/412 |
| 2,406,459 | A * | 8/1946 | Gibson | E05C 9/04 292/39 |

(Continued)

*Primary Examiner* — Christine M Mills
*Assistant Examiner* — Faria F Ahmad
(74) *Attorney, Agent, or Firm* — Haynes and Boone, LLP

(57) ABSTRACT

A handle system for a sliding door system is provided. The handle system includes: a first panel; a second panel wherein at least one of the first and second panels is configured to move in a direction parallel to the other of the first and second panels and the first and second panels are configured to also move together in a generally pivoting motion; handle located on one of the first and second panels; and a latch operatively connected to the handle, the latch configured so that movement of the handle moves the latch from a locking position to an unlocking position to allow the first and second panel to pivot.

17 Claims, 3 Drawing Sheets

(56) References Cited

U.S. PATENT DOCUMENTS

| | | | | | | |
|---|---|---|---|---|---|---|
| 3,048,898 | A | * | 8/1962 | Davis | E05D 15/50 | 16/230 |
| 3,582,119 | A | * | 6/1971 | Woodworth | E05B 63/127 | 292/29 |
| 3,645,572 | A | * | 2/1972 | McFarlane | E05B 13/002 | 292/DIG. 61 |
| 3,729,220 | A | * | 4/1973 | Andres | E05C 9/043 | 292/336.3 |
| 3,990,278 | A | * | 11/1976 | Perelson | E05C 9/06 | 70/120 |
| 3,993,335 | A | * | 11/1976 | Schmidt | E05B 65/1066 | 292/336.3 |
| 4,037,440 | A | * | 7/1977 | Shabtai | E05C 9/06 | 70/120 |
| 4,099,753 | A | * | 7/1978 | Gwozdz | E05C 7/06 | 292/1.5 |
| 4,154,070 | A | * | 5/1979 | Bahry | E05C 9/06 | 70/120 |
| 4,362,034 | A | * | 12/1982 | Amgar | E05C 9/16 | 70/120 |
| 4,382,620 | A | * | 5/1983 | Horgan, Jr. | E05B 65/106 | 292/336.3 |
| 4,387,917 | A | * | 6/1983 | Cocker | E05B 65/1066 | 292/93 |
| 4,703,963 | A | * | 11/1987 | Ball | E05B 85/10 | 292/336.3 |
| 4,732,417 | A | * | 3/1988 | Yang | E05C 1/14 | 292/336.3 |
| 4,973,091 | A | * | 11/1990 | Paulson | E05C 9/042 | 292/216 |
| 5,373,716 | A | * | 12/1994 | MacNeil | E05C 9/1808 | 70/489 |
| 5,513,505 | A | * | 5/1996 | Dancs | E05B 65/1086 | 292/DIG. 60 |
| 5,709,111 | A | * | 1/1998 | Henao | E05B 15/108 | 70/120 |
| 5,816,309 | A | * | 10/1998 | Paradise | E06B 7/36 | 160/40 |
| 5,865,479 | A | * | 2/1999 | Viney | E05C 9/041 | 70/DIG. 42 |
| 5,911,763 | A | * | 6/1999 | Quesada | E05C 9/06 | 70/108 |
| 5,931,515 | A | * | 8/1999 | Stendal | E05C 7/06 | 292/335 |
| 6,030,019 | A | * | 2/2000 | Stiltner | B62D 33/037 | 70/120 |
| 6,120,071 | A | * | 9/2000 | Picard | E05B 65/1046 | 292/DIG. 21 |
| 6,209,931 | B1 | * | 4/2001 | Von Stoutenborough | E05C 9/041 | 292/160 |
| 6,282,929 | B1 | * | 9/2001 | Eller | E05C 9/02 | 70/109 |
| 6,478,345 | B1 | * | 11/2002 | Viney | E05C 9/047 | 70/108 |
| 7,036,852 | B2 | * | 5/2006 | Cho | E05B 83/30 | 292/160 |
| 7,526,933 | B2 | * | 5/2009 | Meekma | E05C 9/185 | 70/120 |
| 7,950,439 | B2 | * | 5/2011 | Anderson | E05D 15/58 | 160/195 |
| 8,590,351 | B2 | * | 11/2013 | Ookawara | E05C 9/047 | 292/37 |
| 8,657,345 | B1 | * | 2/2014 | Shih | E05B 63/0056 | 292/37 |
| 9,074,392 | B2 | * | 7/2015 | Berger | E05B 53/003 | |
| 9,637,957 | B2 | * | 5/2017 | Hagemeyer | E05C 1/004 | |
| 10,760,303 | B2 | * | 9/2020 | Zeus | E05C 9/021 | |
| 11,008,788 | B2 | * | 5/2021 | Brown | E05B 67/38 | |
| 2005/0184531 | A1 | * | 8/2005 | Lin | E05B 65/1053 | 292/92 |
| 2008/0250716 | A1 | * | 10/2008 | Ranaudo | E06B 3/4636 | 49/31 |
| 2011/0309640 | A1 | * | 12/2011 | Matsubara | E05B 63/248 | 292/159 |

* cited by examiner

DOOR HANDLE SYSTEM FOR PIVOTING A SLIDING DOOR

TECHNICAL FIELD

This patent disclosure relates generally to door handle systems and, more particularly, to a door handle system that allows a sliding door system to swing or "breakout."

BACKGROUND

Sliding door systems are used as entryways and exits to intensive care units ("ICU") and critical care units in hospitals. In particular, patient rooms in these units are equipped with large manual sliding doors. The doors often have glass panels to allow medical professionals a view of the patients that need round-the-clock monitoring. Because stretchers, wheelchairs, and other medical equipment are frequently moved in and out of the ICU, sliding doors are often employed. In addition, an intensive care unit has certain environmental standards that should be maintained to ensure a healthy environment for patient recovery. For example, in certain ICUs, the sliding doors do not have tracks. For example, many intensive care units have sliding doors that are supported without a bottom track that is fixed to the floor. In these types of doors, the upper track provides the primary support and guides the linear motion of the door as it slides to open and close.

Another concern with sliding doors is that they have the ability to breakout. That is, they should have the ability to rotate away from the direction of sliding, so that a pulling force will cause the door to swing open. The terms "breakout," "breakaway," and "swingout" refer to the ability of the door to be opened by rotating the panels of the door, as opposed to the normal sliding motion of the panels. This feature may be employed in an emergency and should be able to be accomplished following a simple procedure detailed in the provided user manual and displayed on a label affixed to the door panel.

As such, a sliding door system with an easy and intuitive system for allowing the sliding door to swing or "breakout" is desired.

SUMMARY

The foregoing needs are met to a great extent by embodiments in accordance with the present disclosure, wherein, in some embodiments provides an easy and intuitive system for allowing the sliding door to swing or "breakout."

In one aspect, the disclosure describes a handle system for a sliding door system. The handle system includes: a first panel; a second panel wherein at least one of the first and second panels is configured to move in a direction parallel to the other of the first and second panels and the first and second panels are configured to also move together in a generally pivoting motion; handle located on one of the first and second panels; and a latch operatively connected to the handle, the latch configured so that movement of the handle moves the latch from a locking position to an unlocking position to allow the first and second panel to pivot.

In yet another aspect, the disclosure describes a handle system for a sliding door system. The handle includes: a first panel; a second panel wherein at least one of the first and second panels is configured to move in a direction parallel to the other of the first and second panels and the first and second panels are configured to also move together in a generally pivoting motion; handle located on one of the first and second panels; a pivot pin about which the handle pivots between a latching to unlatching handle position; a camming surface on the handle; a camming protrusion; a rod operatively connected to the camming protrusion; and a bolt operatively connected to the rod, the bolt configured to move between a latching and unlatching position, wherein pivoting movement of the handle to the unlatching handle position causes the camming surface on the handle to engage and move the camming protrusion to cause the rod and bolt to move axially to move from the latching to unlatching position.

The disclosure also provides, in another aspect, a method of configuring at least one panel of a sliding door system to pivot. The method includes: providing a first and second door panels and at least one of the door panels moves in a direction parallel with respect to the other other door panel; providing a handle on a panel of the door system; configuring the handle to move and thereby operate a latch; and configuring the latch to move between a locking and unlocking position wherein unlatching allows multiple panels of the door to pivot.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Additional features, advantages, and aspects of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate aspects of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION

Figure 1:
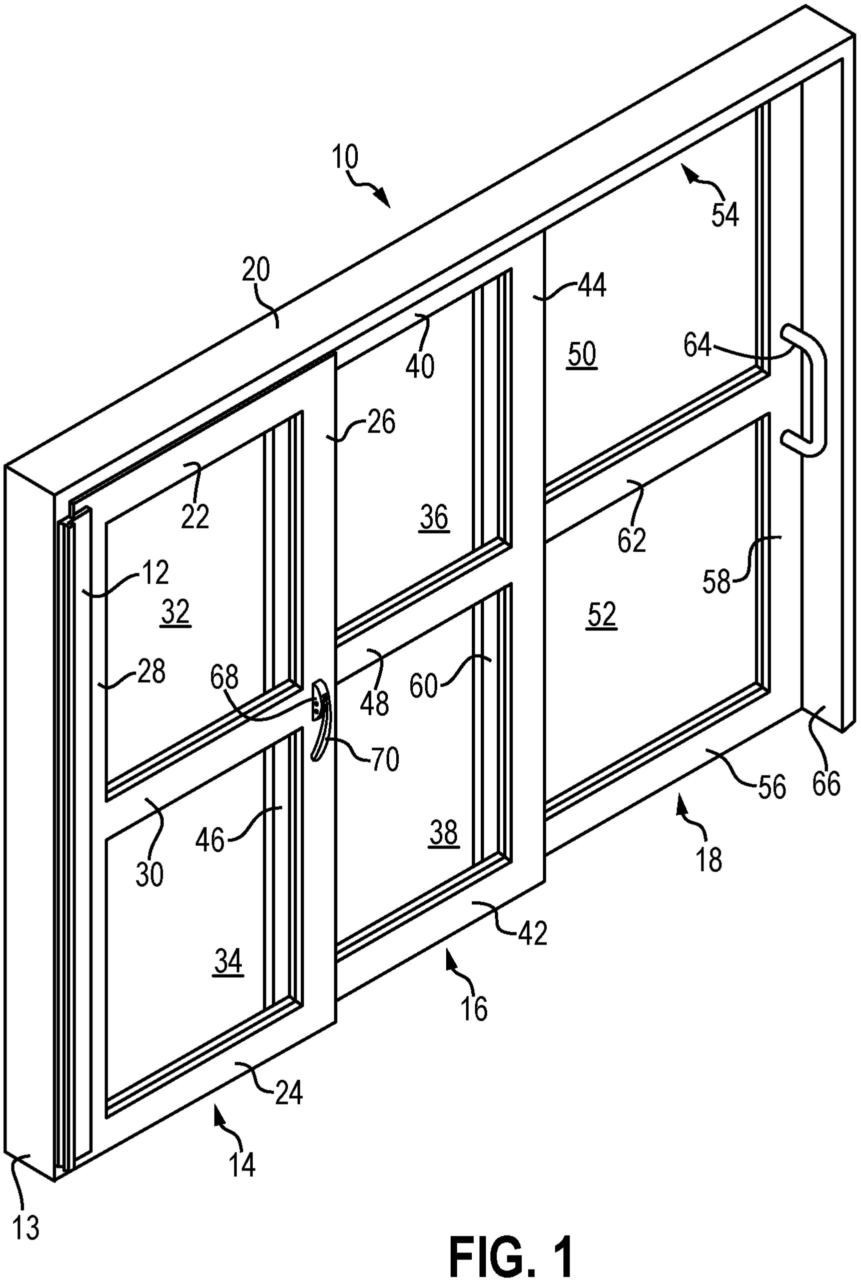
FIG. 1 is a perspective view of a door system incorporating a handle in accordance with the present disclosure.

The aspects of the disclosure and the various features and advantageous details thereof are explained more fully with reference to the non-limiting aspects and examples that are described and/or illustrated in the accompanying drawings and detailed in the following description. It should be noted that the features illustrated in the drawings are not necessarily drawn to scale, and features of one aspect may be employed with other aspects as the skilled artisan would recognize, even if not explicitly stated herein. Descriptions of well-known components and processing techniques may be omitted so as to not unnecessarily obscure the aspects of the disclosure. The examples used herein are intended merely to facilitate an understanding of ways in which the disclosure may be practiced and to further enable those of skill in the art to practice the aspects of the disclosure. Accordingly, the examples and aspects herein should not be construed as limiting the scope of the disclosure, which is defined solely by the appended claims and applicable law. Moreover, it is noted that like reference numerals represent similar parts throughout the several views of the drawings.

FIG. 1, is a perspective view of a telescoping door system 10 with a swing clear breakout hinge 12 that allows the panels of the door system 10 to be broken out to create a large opening through which oversized equipment, furniture, and the like may fit through.

FIG. 1 is a perspective view of the telescoping door system 10. The telescoping door system 10 includes a sidelite panel 14, a slow slide panel 16, and a fast slide panel 18. The sidelite panel 14 is coupled to the trailing door jamb for pivotal movement, but it does not move linearly. The slide panels 16, 18 are known in the art as the "SX," and the sidelite 14 is known as the "SO." The slow slide panel 16 is immediately coupled to the sidelite 14, and the fast slide panel 18 is immediately coupled to and leads the slow slide panel 16. The slide panels 16, 18 and the sidelite panel 14 are supported by a header 20. The header 20 includes the track that guides the linear motion of the slide panels 16, 18 of the telescoping door system 10. According to certain embodiments, the header 20 may be nylon covered aluminum. The slide panels 16, 18 move linearly with respect to the sidelite 14 in a telescoping manner with the fast slide panel 18 leading and controlling the linear movement of the slow slide panel 16. The slow slide panel 16 is also guided by a track located in the bottom of the panel that is coupled to a guide assembly located at the bottom of the sidelite 14. The bottom of the fast slide panel 18 is guided by a guide assembly attached to the bottom rail 42 of the slow slide panel 16. According to certain embodiments, a pin portion of a pin assembly is received in a track disposed in an underside of the bottom rail of each of the slow slide panel 16 and the fast slide panel 18. The tracks constrain the motion of the respective pins and therefore guide the linear motion of each of the slide panels 16, 18 with respect to the other slide panels.

The telescoping door system 10 may include a floor mounted track that helps to guide the linear motion of the slide panels 16, 18, or according to some embodiments, the floor mounted track may be omitted. In certain healthcare facilities, such as an intensive care unit in a hospital, it may be undesirable to have a floor track.

The sidelite 14 includes a top rail 22, a bottom rail 24, a lead rail 26, a trailing rail 28, and may include a mid-rail 30 in lieu of a single pane of glass. An upper pane of glass 32 is framed by a portion of the lead rail 26, the trailing rail 28, the top rail 22, and the mid-rail 30. A lower pane of glass 34 is framed by portions of the lead rail 26, the trailing rail 28, the bottom rail 24, and the mid-rail 30. The slow slide panel 16 similarly includes upper and lower glass panes 36, 38 framed by a top rail 40, a bottom rail 42, a lead rail 44, a trailing rail 46, and a mid-rail 48. The fast slide panel 18 also includes upper glass pane 50 and lower glass pane 52 framed by an upper rail 54, a bottom rail 56, a lead rail 58, a trailing rail 60, and a mid-rail 62. The rails may be made of any suitable material. However, in certain embodiments a light weight material, such as aluminum may be used for the various rails of the door system 10. According to an alternate embodiment, each panel may have only one glass pane or more than two glass panes.

A user moves the telescoping door system 10 from a fully open position to a fully closed position by manually applying a force to a handle 64 disposed on the lead rail 58 of the fast slide panel 18 to displace the fast slide panel 18 toward a lead jamb 66. The fast slide panel 18 is linearly displaced a certain distance, and it catches the slow slide panel 16 and displaces it toward the lead jamb 66 until the fast slide panel 18 reaches the lead jamb 66. The fast slide panel 18 may be positively latched to maintain the door system 10 in the fully closed position. To move the telescoping door system 10 from the fully closed position to the fully open position, the reverse occurs when the user applies the force to the fast slide panel 18 to linearly displace it toward the trailing jamb 13 (also referred to herein as a pivot jamb), and after the fast slide panel 18 is linearly displaced a certain distance, it catches the trailing end 17 of the slow slide panel 16 and displaces it toward the trailing jamb 13. Alternatively, the linear motion of the slide panels 16, 18 may be driven by an operator for automatic sliding movement of the panels 16, 18.

The telescoping door system 10 may also be one half of dual telescoping door system 10 where a second multi-panel telescoping door is disposed opposite the telescoping door system 10 such that a fully closed position has the two telescoping door systems 10 meeting each other in a center of the door frame or opening.

The teachings of the present disclosure are not limited to a three-panel telescoping door system, but rather may be also be employed with a dual-panel slide/swing door system or a door system employing more than three panels.

In addition to sliding parallel to each other in a telescoping manner, the panels 14, 16, and 18 of the door system 10 can "break out" or pivot. A handle 70 attached to a housing 68 is located on the panel 14 to unlatch the door system 10 to allow the door system 10 to pivot.

Figure 2:
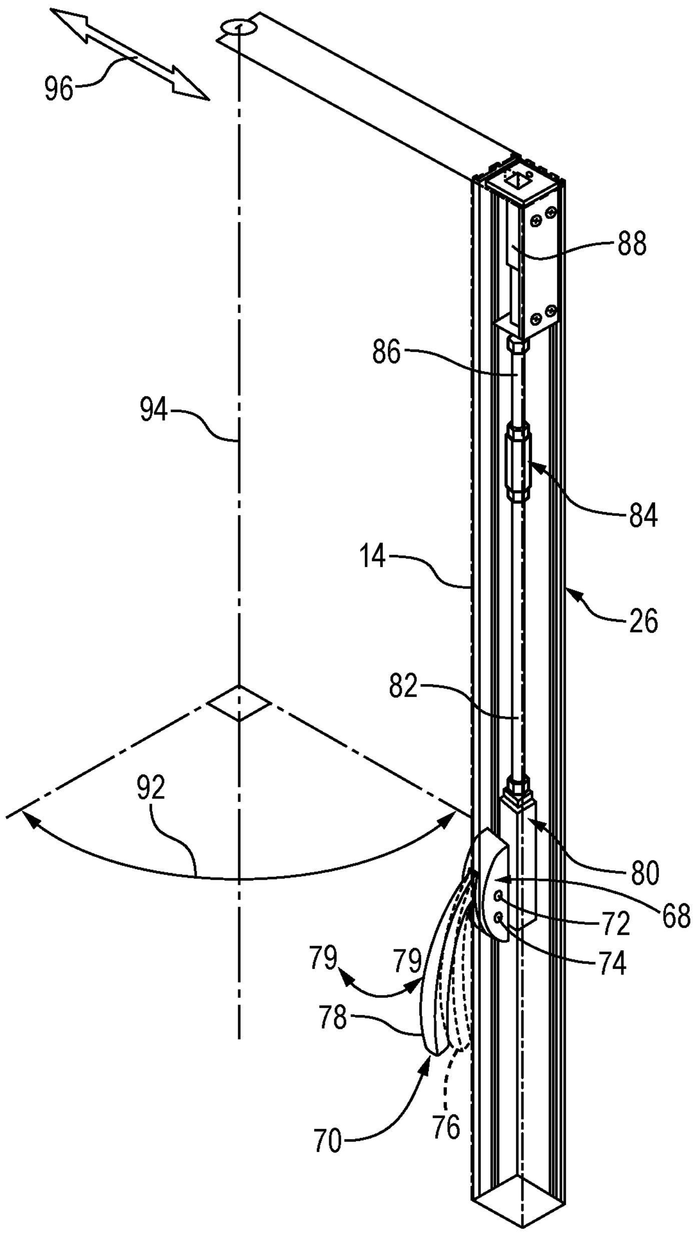
FIG. 2 is a partial perspective view of a handle system in accordance with the present disclosure showing hidden portions of the handle system.

FIG. 2 shows the handle 70 attached to the housing 68 via a slide pin 72 and pivot pin 74. The handle 70 moves between a first position 76 which in the embodiment shown is a latched position and a second position 78 which in the illustrated embodiment is an unlatching position as shown by arrows 79. The handle 70 is operatively connected to a latch mechanism 80. The latch mechanism is connected to an interior rod 82. The interior rod 82 is connected to a bolt linkage 86. The bolt linkage 86 is connected to an upper rod 86 and connects to a bolt or latch 88.

Movement of the bolt or latch 88 in and out of the door panel 14 is what latches and unlatches the door system 10. When the bolt 88 is extending out the of the panel 14, the bolt 88 extends into a recess (not shown) in the door header 20 (see FIG. 1) thereby latching the door system 10 and preventing the door panels 14, 16, and 18 from pivoting.

The vertical rail (or lead rail) 26 of the door panel 14 is shown in FIG. 2 to be transparent so the features described above that reside in the vertical rail 26 (latch mechanism 80, interior rod 82, bolt linkage 84, upper rod 86 and the bolt or latch 88) can be seen.

Arrows 92 show the arc about which the panel 14 pivots. The pivot axis 94 is also shown. Arrows 96 shows the slide plane, in other words, the directions of the sliding motions of the door panels 14, 16, and 18 move with respect to each other. In the illustrated embodiment, panel 14 is fixed from sliding motion and does not move in the direction of the arrows 96, but there is relative motion between panel 14 and the other panels 16 and 18.

Figure 3:
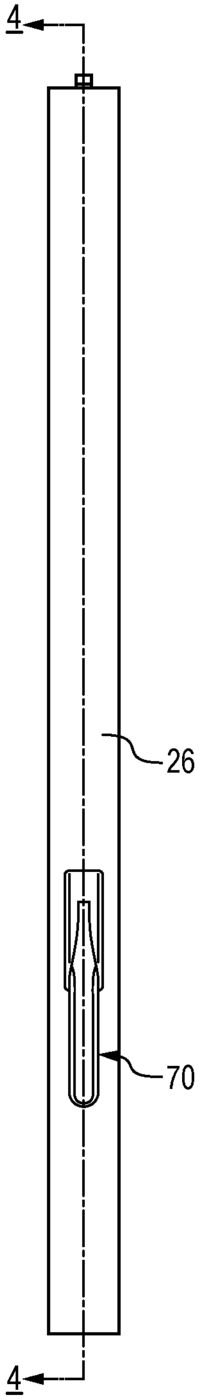
FIG. 3 is a partial side view of a door and handle system.

FIG. 3 is an end view of the vertical rail 26. It also shows the handle 70. Line 4-4 shows where the cross-section was taken for the cross-sectional view of FIG. 4

Figure 4:
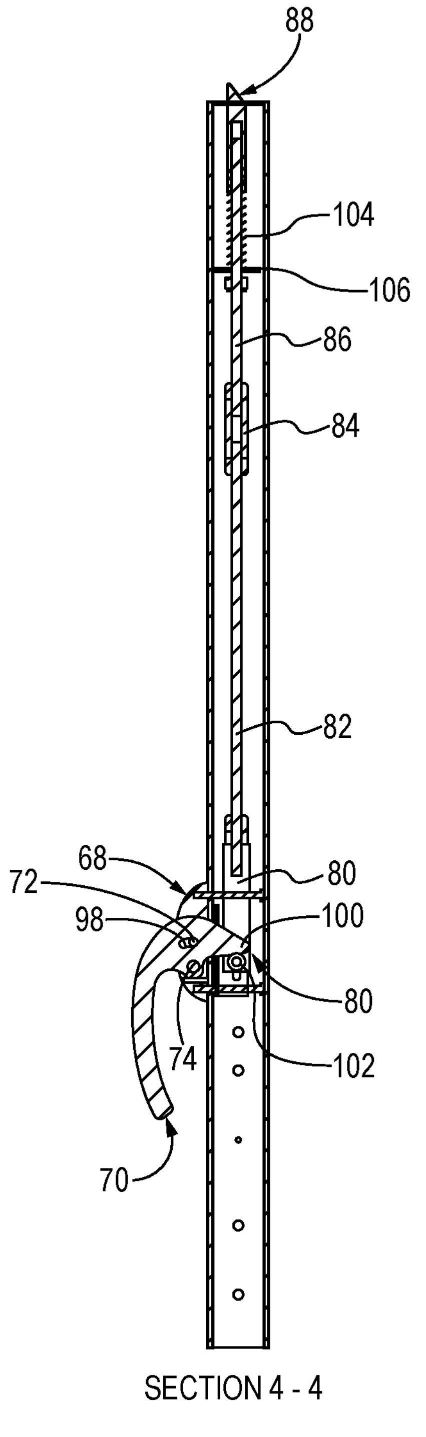
FIG. 4 is a cross-sectional view taken along line 4-4 of FIG. 3.

FIG. 4 is a cross-sectional view showing the handle 70 and the housing 68 and the slide pin 72 residing in the slot 98. The slide pin 72 and slot 98 provide limits to the pivoting movement of the handle 70. The handle 70 has an actuating portion or cam surface 100 that cams against a camming protrusion as a rod projection 102 attached to the interior rod 82 when the handle 70 is moved to the second (unlatching position) 78. The camming action of the handle's cam surface 100 pushes rod projection 102 and therefore the interior rod 82, bolt linkage 84, upper interior rod 86, and the bolt 88 down against the force of the spring 104. The spring 104 urges against a spring collar 106 attached to the vertical rail 26 at one end and the other end of the spring 104 urges against the bolt or latch 88.

Movement of the bolt or latch 88 downward and into the vertical rail 26 against the spring 104 causes the door system 10 to be unlatched and free to pivot. The handle 70 is designed and its location selected to unlatch the bolt 88 and swingout the panels 14, 16, and 18 in one single action. Therefore, movement of the handle 70 to the unlatched position 78 causes both the bolt 88 to move to the unlatched (second) position and continued pull on the handle 70 in the direction toward the unlatched (second) position causes the panels 14, 16, and 18 to pivot.

When the handle 70 is released the spring 104 moves the interior rod 82, bolt linkage 84, upper interior rod 86, the bolt 88, rod projection 102 up and the handle 70 back to the latched 76 (first position).

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

We claim:

1. A handle system for a sliding door system comprising:
- a first panel;
- a second panel wherein at least one of the first or second panels is configured to move in a direction parallel to the other of the first or second panels and the first and second panels are configured to also move together in a generally pivoting motion;
- a handle located on one of the first or second panels; and
- a latch operatively connected to the handle, the latch configured so that movement of the handle away from the one of the first or second panels moves the latch in a vertical direction from a locking position to an unlocking position to allow the first and second panels to pivot, wherein the handle pivots about a pivot pin and defines a slot in which a slide pin resides and the handle slides along the slide pin when the handle moves.

2. The handle system of claim 1, further including an actuating portion on the handle configured to move a rod axially to move the latch between the locking position and the unlocking position when the handle is moved.

3. The handle system of claim 2, further comprising a spring biasing the latch to the locking position.

4. The handle system of claim 3, wherein the spring also biases the handle to a first position.

5. The handle system of claim 2, wherein the actuating portion engages a protrusion on the rod.

6. The handle system of claim 1, wherein the handle is located on a panel that is configured to not move in a direction parallel to the other panel.

7. The handle system of claim 6, wherein the sliding door system has three panels, two that slide and one that does not slide.

8. A handle system for a sliding door system comprising:
- a first panel;
- a second panel wherein at least one of the first or second panels is configured to move in a direction parallel to the other of the first and second panels and the first and second panels are configured to also move together in a generally pivoting motion;
- a handle located on one of the first or second panels;
- a pivot pin about which the handle pivots between a latching handle position to an unlatching handle position;
- a camming surface on the handle, the camming surface disposed within a rail of the one of the first or second panels;
- a camming protrusion;
- a rod operatively connected to the camming protrusion;
- a slider pin located in a slot and configured so that when the handle is moved between the latching and unlatching handle positions the slider pin slides in the slot; and
- a bolt operatively connected to the rod, the bolt configured to move in a vertical direction between a latching position and an unlatching position,
- wherein pivoting movement of the handle to the unlatching handle position causes the camming surface on the handle to engage and move the camming protrusion to cause the rod and bolt to move axially to move the bolt from the latching position to the unlatching position.

9. The handle system of claim 8, further comprising a spring biasing the bolt to the latching position.

10. The handle system of claim 8, wherein the handle is located on a panel that is configured to not move in a direction parallel to the other panel.

11. The handle system of claim 10, wherein the sliding door system has three panels, two that slide and one that does not slide.

12. The handle system of claim 8, wherein the handle is arranged so that pivoting movement of the handle occurs in a plane transverse to a plane defined by the first panel and a plane defined by the second panel.

13. A method of configuring at least one panel of a sliding door system to pivot comprising:

providing first and second door panels wherein at least one of the door panels moves in a direction parallel with respect to the other door panel;

providing a handle on one of the first or second door panels;

configuring the handle to pivot away from the one of the first or second door panels and thereby operate a latch, wherein the handle is configured to pivot about a pivot pin and defines a slot in which a slide pin resides; and configuring a portion of the latch protruding from the one of the first or second door panels to move in a vertical direction between a locking position and an unlocking position as the handle pivots away from the one of the first or second door panels, wherein the unlocking position allows multiple panels of the door to pivot.

14. The method of claim 13, wherein the handle is located on the first panel and the first panel does not move in a direction parallel to the second panel.

15. The method of claim 13, further comprising pivoting the sliding door system by moving the handle to an unlocking handle position and continuing to exert force on the handle to cause the sliding door system to pivot.

16. A method of configuring at least one panel of a sliding door system to pivot comprising:

providing first and second door panels wherein at least one of the door panels moves in a direction parallel with respect to the other door panel;

providing a handle on one of the first or second door panels;

configuring the handle to pivot away from the one of the first or second door panels and thereby operate a latch;

configuring the latch to move in a vertical direction between a locking position and an unlocking position as the handle pivots away from the one of the first or second door panels, wherein the unlocking position allows multiple panels of the door to pivot;

configuring a spring to compress when the handle is pivoted; and configuring a slide pin to slide in a slot on the handle when the handle is pivoted.

17. The method of claim 16, further comprising:

providing a camming portion on the handle;

providing a projection operatively connected to the latch; and configuring the camming portion to cam against projection to move the latch when the handle is pivoted.

* * * * *